US011200989B1

United States Patent
Sundararajan et al.

(10) Patent No.: US 11,200,989 B1
(45) Date of Patent: Dec. 14, 2021

(54) APERIODIC DATA DRIVEN COGNITIVE CONTROL SYSTEM

(71) Applicant: International Business Machines Corporation, Armonk, NY (US)

(72) Inventors: Mukundan Sundararajan, Bangalore (IN); Kiran Nayak, Bengaluru (IN)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 17/151,793

(22) Filed: Jan. 19, 2021

(51) Int. Cl.
*H04L 12/24* (2006.01)
*G16Y 40/35* (2020.01)
*G16Y 40/10* (2020.01)
*H04L 29/08* (2006.01)
*G16Y 30/00* (2020.01)
*G16Y 20/20* (2020.01)

(52) U.S. Cl.
CPC .............. *G16Y 40/35* (2020.01); *G16Y 20/20* (2020.01); *G16Y 30/00* (2020.01); *G16Y 40/10* (2020.01); *H04L 67/12* (2013.01)

(58) Field of Classification Search
CPC ........ H04L 67/12; G16Y 20/20; G16Y 30/00; G16Y 40/10; G16Y 40/35
See application file for complete search history.

(56) References Cited

U.S. PATENT DOCUMENTS

| 2008/0294308 | A1* | 11/2008 | Watson | G07C 5/0816 701/21 |
| 2017/0006141 | A1 | 1/2017 | Prasenjit | |
| 2020/0401222 | A1* | 12/2020 | Wisbey | A61B 5/7275 |

OTHER PUBLICATIONS

Adhav et al., "An IoT Based Monitoring and Control System For Environmental Conditions and Safety In Home," International Journal of Engineering Development and Research (IJEDR), vol. 4, Issue 4, p. 688-692. <https://www.ijedr.org/papers/IJEDR1604106.pdf>, 2016.

De La Peña, et al. "Lyapunov-Based Model Predictive Control of Nonlinear Systems Subject to Data Losses," IEEE Transactions On Automatic Control, vol. 53, No. 9, Oct. 2008, 14 pages, <http://pdclab.seas.ucla.edu/Publications/DMunozdelaPena/DMunozdelaPena_PDChristofides_ITAC_2008_53_Lyapunov-Based_Model_Predictive_Control_Nonlinear_Systems_Data_Losses.pdf >.

(Continued)

*Primary Examiner* — Kim T Nguyen
(74) *Attorney, Agent, or Firm* — Mark Bergner (57) ABSTRACT

A method comprises determining respective aperiodic intervals for each of a plurality of sensors to obtain performance measurements of one or more subsystems; predicting performance values of the one or more subsystems based on historical data; outputting the predicted performance values in real-time as the one or more subsystems operate; receiving the performance measurements obtained by the plurality of sensors; comparing the performance measurements obtained by the plurality of sensors at the respective aperiodic intervals to the predicted performance values; and, in response to determining a difference between the performance measurements obtained at the respective aperiodic intervals and the predicted performance values, outputting an indication of the determined difference for display together with the predicted performance values.

20 Claims, 5 Drawing Sheets

(56) References Cited

OTHER PUBLICATIONS

Mell et al., "The NIST Definition of Cloud Computing," Recommendations of the National Institute of Standards and Technology, U.S. Department of Commerce, Special Publication 800-145, Sep. 2011, 7 pages.

Park et al., "CIoT-Net: a scalable cognitive IoT based smart city network architecture," Human-centric Computing and Information Sciences (2019) 9:29, Aug. 1, 2019, 20 pages, <https://link.springer.com/content/pdf/10.1186/s13673-019-0190-9.pdf >.

Sandoval et al., "Performance optimization of LoRa nodes for the future smart city/industry," EURASIP Journal on Wireless Communications and Networking (2019) 2019:200, Aug. 7, 2019, 24 pages. <https://jwcn-eurasipjournals.springeropen.com/track/pdf/10.1186/s13638-019-1522-1>.

Srinidhi et al., "Network optimizations in the Internet of Things: A review," Engineering Science and Technology, an International Journal, Sep. 22, 2018, 21 pages, <https://www.sciencedirect.com/science/article/pii/S2215098618303379>.

\* cited by examiner

APERIODIC DATA DRIVEN COGNITIVE CONTROL SYSTEM

BACKGROUND

Conventional distributed control systems involve a large number of distributed loops which exchange loop responses including sensor measurements and control reference signals at a high frequency. For example, Internet of Things (IoT) sensors can be incorporated into the plurality of sub-systems. The IoT sensors are typically powered on continuously to provide large amounts of data to the control system.

SUMMARY

Aspects of the disclosure may include a computer-implemented method, computer program product, and system. One example of the method comprises determining respective aperiodic intervals for each of a plurality of sensors to obtain performance measurements of one or more subsystems; predicting performance values of the one or more subsystems based on historical data; outputting the predicted performance values in real-time as the one or more subsystems operate; receiving the performance measurements obtained by the plurality of sensors; comparing the performance measurements obtained by the plurality of sensors at the respective aperiodic intervals to the predicted performance values; and, in response to determining a difference between the performance measurements obtained at the respective aperiodic intervals and the predicted performance values, outputting an indication of the determined difference for display together with the predicted performance values.

DRAWINGS

Understanding that the drawings depict only exemplary embodiments and are not therefore to be considered limiting in scope, the exemplary embodiments will be described with additional specificity and detail through the use of the accompanying drawings, in which.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

As used herein, "a number of" when used with reference items, means one or more items. For example, "a number of different types of networks" is one or more different types of networks.

Further, the phrases "at least one", "one or more," and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together. In other words, "at least one of", "one or more of", and "and/or" mean any combination of items and number of items may be used from the list, but not all of the items in the list are required. The item may be a particular object, a thing, or a category. Additionally, the amount or number of each item in a combination of the listed items need not be the same. For example, in some illustrative examples, "at least one of A, B, and C" may be, for example, without limitation, two of item A; one of item B; and ten of item C; or 0 of item A; four of item B and seven of item C; or other suitable combinations.

Additionally, the term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

Furthermore, the term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Figure 1:
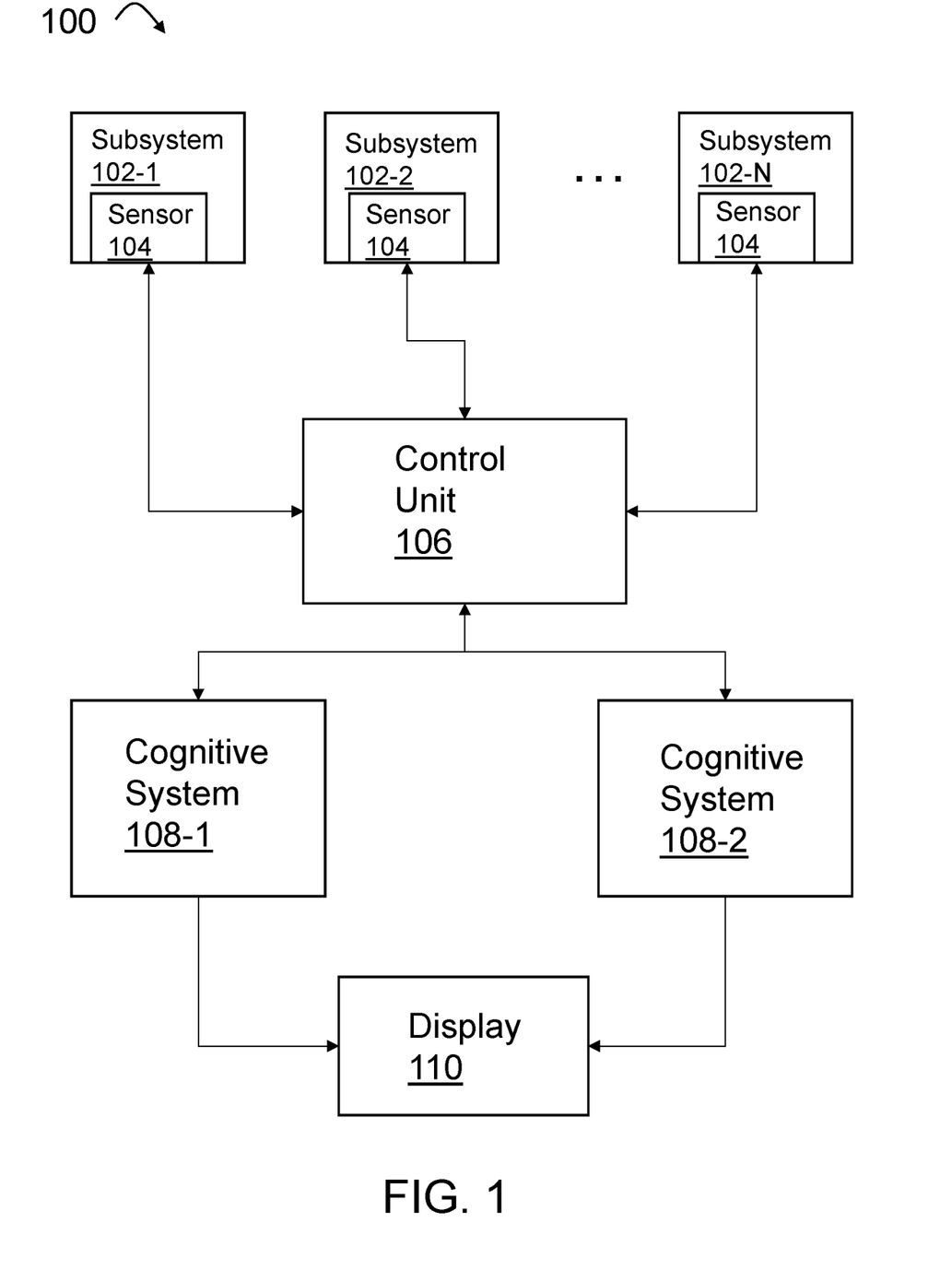
FIG. 1 is a block diagram of one embodiment of a control system.

FIG. 1 is a high-level block diagram depicting one embodiment of an example distributed control system 100. The control system 100 includes a plurality of sub-systems 102-1 . . . 102-N (collectively referred to herein as subsystems 102), a control unit 106, a first cognitive system 108-1, a second cognitive system 108-2, and a display 110. The control system 100 can be implemented in many different environments, such as, but not limited to a manufacturing plant, a power plant, an apartment building, other entities where multiple operations are in a closed loop control mode, etc. Thus, the subsystems 102 can be implemented differently depending on the environment in which they are implemented. For example, each subsystem 102 could represent a pump system, a heating system, a lift, a sub-assembly of a manufacturing line, etc. The performance of each subsystem 102 is monitored and controlled by the control unit 106. In particular, each subsystem 102 includes one or more sensors 104 which are configured to communicate with the control unit 106.

The sensors 104 can communicate with the control unit 106 via wires (e.g. coaxial cable, twisted pair, optical fiber, etc.) and/or wireless communication. In embodiments in which the sensors 104 are configured to communicate wirelessly, the wireless network can be implemented using any suitable wireless network, such as but not limited to a cellular network, Wi-Fi network, etc. The wireless network may include one or more private or public computing networks. Additionally, the wireless network may form part of a packet-based network, such as a local area network, a wide-area network, and/or a global network such as the Internet. Thus, the sensors 104 and control unit 106 can communicate with each other via one or more servers, networks, or databases, and can use one or more communication protocols to transfer data. For example, in some embodiments, the sensors 104 are implemented as Internet of Things (IoT) devices which communicate with the control unit 106 over the internet. Thus, in some embodiments, the control unit 106 can be implemented in a cloud computing environment as discussed in more detail below. In other embodiments, the control unit 106 and the sensors 104 are implemented in a private local area network.

As discussed above, the subsystems 102 can be implemented differently in various embodiments and often need to switch between turning on and off based on operating conditions. For example, a pump may turn on to pump a fluid for a given amount of time or until a certain amount of fluid has been pumped. Similarly, a heater may turn on at a given schedule for a set amount of time or may turn on and off to maintain a detected temperature within a preset range. Alternatively, some implementations of the subsystems 102 maintain the subsystems 102 operating continuously. In both situations (i.e. continuous operation or discontinuous operation), each of the sensors 104 is configured to collect data regarding the operation of the respective subsystem 102. Some example measurements can include, but are not limited to, operating temperature, power consumed, time to turn on/off, time to reach max performance, etc. This information collected by the sensors 104 is used by the control unit 106 to manage and monitor operation of the subsystems 102.

In conventional control systems, sensors typically need to send measurements to a control unit at a high frequency or operate continuously in order to provide the needed data. Furthermore, the sensors in conventional systems are often placed in areas where they can not be powered from a mains power supply and need to operate on battery power. The high frequency of sending data, thus, uses significant amounts of power and can require higher power regeneration capability and/or frequent replacement of batteries. In contrast to conventional systems, through the techniques described herein embodiments of the control system 100 enable the sensors 104 to send data at more infrequent intervals than in conventional systems while still providing the data needed for real-time monitoring and control of the subsystems 102. As such, the embodiments described herein enable improved power conservation over conventional systems.

In addition, many conventional systems have significant communication bandwidth requirements depending on the number of sensors and frequency of reporting from the sensors in order to avoid collisions between the signals from different sensors. Furthermore, such conventional systems are not as flexible in configuration and changes, such as adding additional subsystems and/or sensors, and can require a reconfiguration of the entire system and/or the addition of more communication equipment in order to handle the increased bandwidth requirements. In contrast to such conventional systems, the techniques described herein enable a more flexible configuration of control system 100. For example, the control system 100 can require less bandwidth than for a comparably sized conventional system and can accommodate the addition of subsystems and/or sensors without requiring a reconfiguration of the entire system. Furthermore, such addition of subsystems 102 and/or sensors 104 can be accommodated in embodiments of the control system 100 with little to no required increase in in bandwidth capability through the use of the techniques described herein.

The sensors 104 are configured to take performance measurements at aperiodic time intervals. In particular, the cognitive system 108-1 is configured to learn and create the aperiodic time points for measurements for different distributed subsystems 102 that are controlled by the control unit 106. For example, the cognitive system 108-1 can utilize machine learning techniques to identify respective aperiodic time intervals for each sensor 104. Example machine learning techniques can comprise algorithms or models that are generated by performing supervised, unsupervised, or semi-supervised training on a dataset. Machine learning algorithms can include, but are not limited to, decision tree learning, association rule learning, artificial neural networks, deep learning, inductive logic programming, support vector machines, clustering, Bayesian networks, reinforcement learning, representation learning, similarity/metric training, sparse dictionary learning, genetic algorithms, rule-based learning, and/or other machine learning techniques.

For example, the machine learning algorithms can utilize one or more of the following example techniques: K-nearest neighbor (KNN), learning vector quantization (LVQ), self-organizing map (SOM), logistic regression, ordinary least squares regression (OLSR), linear regression, stepwise regression, multivariate adaptive regression spline (MARS), ridge regression, least absolute shrinkage and selection operator (LASSO), elastic net, least-angle regression (LARS), probabilistic classifier, naïve Bayes classifier, binary classifier, linear classifier, hierarchical classifier, canonical correlation analysis (CCA), factor analysis, independent component analysis (ICA), linear discriminant analysis (LDA), multidimensional scaling (MDS), non-negative metric factorization (NMF), partial least squares regression (PLSR), principal component analysis (PCA), principal component regression (PCR), Sammon mapping, t-distributed stochastic neighbor embedding (t-SNE), bootstrap aggregating, ensemble averaging, gradient boosted decision tree (GBRT), gradient boosting machine (GBM), inductive bias algorithms, Q-learning, state-action-reward-state-action (SARSA), temporal difference (TD) learning, a priori algorithms, equivalence class transformation (ECLAT) algorithms, Gaussian process regression, gene expression programming, group method of data handling (GMDH), inductive logic programming, instance-based learning, logistic model trees, information fuzzy networks (IFN), hidden Markov models, Gaussian naïve Bayes, multinomial naïve Bayes, averaged one-dependence estimators (AODE), Bayesian network (BN), classification and regression tree (CART), chi-squared automatic interaction detection (CHAID), expectation-maximization algorithm, feed-forward neural networks, logic learning machine, self-organizing map, single-linkage clustering, fuzzy clustering, hierarchical clustering, Boltzmann machines, convolutional neural networks, recurrent neural networks, hierarchical temporal memory (HTM), and/or other machine learning techniques.

Furthermore, the cognitive system 108-1 can assign initial aperiodic time intervals and then update or modify the assigned aperiodic time intervals based on performance observations of the subsystems 102 and/or other environmental factors. The aperiodic time intervals can be determined and/or updated based on past performance data of the subsystems 102 received by the cognitive system 108-1. For example, if the received sensor data indicates an abnormality, the time period between aperiodic time intervals can be reduced to observe the given subsystem 102 at closer time points. Additionally, when a subsystem 102 and/or sensor 104 is first installed in the control system 100, the cognitive system 108-1 can assign initial aperiodic time intervals for measuring performance that are spaced relatively close together. Then, after the subsystem 102 and/or sensor 104 has been operating and observed for a given period of time or after a given threshold performance level, etc., the cognitive system 108-1 can adjust the aperiodic time intervals to be more spaced apart than the initial aperiodic time intervals.

The cognitive system 108-1 is configured to determine the respective aperiodic time intervals for each sensor 104 such that the likelihood of two or more sensors overlapping is reduced or mitigated. By assigning aperiodic time intervals in a way that reduces or mitigates two sensors transmitting at the same time, the amount of bandwidth needed for the sensors can also be reduced. That is, each sensor 104 does not need to be continuously connected to the network. Thus, a separate channel or antenna is not needed for each sensor 104 to communicate with the control unit 106. Rather, more than one sensor 104 can share the antenna/channel/bandwidth since the two sensors are not transmitting at the same time. Furthermore, in response to detecting the addition of more sensors 104, the cognitive system 108-1 can re-calculate the aperiodic time intervals for the sensors such that the newly added sensors 104 do not overlap a transmission time of other sensors 104 (e.g. communication collision) without requiring an increase in the communication bandwidth.

Each of the sensors 104 is configured to measure performance of the respective subsystem 102 at the aperiodic time intervals assigned by the cognitive system 108-1. Thus, the sensors 104 do not need to operate continuously, but can be configured to go into a low power state or disconnect from the network when not measuring performance of the respective subsystem 102. The sensors 104 are configured to report/communicate the measurements to the control unit 106 at each assigned aperiodic time interval in some embodiments. In other embodiments, the sensors 104 are configured to collect the measurements at the assigned aperiodic time intervals, but then transfer the collected measurements together during a burst. For example, a given sensor may be assigned to collect measurements at intervals of 1 second, 3 seconds, 7 seconds, and 20 seconds. The sensor can be assigned to transmit the measurements from each of the 4 intervals in a burst at the last interval of 20 seconds rather than at each of the aperiodic intervals. It is to be understood that the above intervals are merely provided for purposes of explanation but are not to be taken in a limiting sense. In addition, the aperiodic intervals can be set at specific time values, such as 1:00 PM, 1:05 PM, etc., or at relative time values, such as 100 milliseconds, 220 milliseconds, 530 milliseconds, etc. after a trigger event has occurred. For example, such trigger events can be, but are not limited to, receiving a signal to switch a subsystem 102 on or off, reaching a given measurement (e.g. operating temperature or fluid level), etc.

By assigning aperiodic intervals for measurement and reporting, the control system 100 helps conserve energy for the sensors 104 by not requiring that they be powered on or connected to the network continuously. Additionally, bandwidth can also be more efficiently used and changes in the system accommodated for by assigning aperiodic intervals for reporting, as discussed above. However, the control system 100 is still configured to provide real time monitoring despite receiving data at aperiodic intervals from the sensors 104. In particular, cognitive system 108-2 is configured to predict performance measurements for the subsystems 102. For example, the cognitive system 108-2 can implement machine learning techniques, such as those described above, to analyze historical data and predict the performance of the subsystems 102. The predicted performance can be output to display 110. The predicted performance can be displayed by the display 110 in a graph format, which can be referred to as a glide path. A glide path is a graph depicting performance values of a subsystem 102 as it operates. For example, a glide path can be used to display the amount of fluid being pumped by a pump subsystem. Under normal operating conditions, for example, when the pump subsystem begins pumping, the rate at which the fluid is being pumped will gradually increase until reaching a maximum rate. It can then maintain that maximum rate (e.g. 10 L per minute as a non-limiting example) for a period of time and then the rate will gradually decline until stopping as the pump subsystem is shut off. Such changes in the pump rate can be depicted on a graph. It is to be understood that the discussion of a pump subsystem is provided solely for purposes of explanation and that other types of subsystems and/or metrics can be depicted on a display. Additionally, the metrics can be depicted in other formats other than a glide path, in other embodiments.

The cognitive system 108-2 predicts the parameter values and displays the predicted values on the display 110 in approximately real-time. When the values measured by the sensors 104 at the aperiodic intervals are received, the cognitive system 108-2 is configured to compare the predicted values to the corresponding measured values. In some embodiments, the measured values are also displayed together with the predicted values, such as by overlaying the measured values on top of the predicted values. In other embodiments, the measured values are only displayed if there is a detected difference between the predicted and measured values. In some embodiments, in response to detecting a difference between the predicted and measured values, the cognitive system 108-2 is configured to update the model being used to predict the values based on the received measured values.

In other embodiments, the cognitive system 108-2 provides information to the cognitive system 108-1 indicating the detected difference. In such embodiments, the cognitive system 108-2 is configured to analyze values received for multiple subsystems 102 to determine if an external event caused the measured value to be different from the predicted value. For example, returning to the case of a pump subsystem, the particular pump subsystem may not reach a predicted maximum pumping rate due to a separate subsystem not providing sufficient fluid to the particular pump subsystem. Thus, the difference between the measured value and the predicted value is due to an external factor rather than degraded performance of the particular pump subsystem, such as due to ordinary wear and tear. The cognitive system 108-1 can output for display on the display 110 a notice indicating the reason for the difference in the measured and predicted values for the particular subsystem. Additionally, the cognitive system 108-1 can instruct the cognitive subsystem 108-2 not to update the model being used.

Additionally, if an external cause of the difference between the measured and predicted values is not identified, the cognitive system 108-1 can determine if an update to the model used by the cognitive system 108-2 is needed. For example, the cognitive system 108-1 may determine that an update is needed after a threshold number of differences have been detected, in some embodiments. The threshold number of differences can refer to a number of cycles (e.g. start and stop cycle) of the subsystem for which one or more differences are detected. As an example, as a subsystem ages, its performance may gradually degrade due to wear and tear. Using the pump subsystem example, such a pump subsystem may degrade to a point where the pump subsystem only reaches a maximum pump rate of 9 L per minute as opposed to the expected 10 L per minute. In some embodiments, the degraded performance is still acceptable, based on user settings, without requiring repair or replacement of the subsystem. Thus, the cognitive system 108-2 can update its model based on the degraded performance of the corresponding subsystem 102.

Additionally, the cognitive system 108-1 can make changes to the aperiodic intervals for the degraded subsystem 102 as well as for other subsystems affected by the degraded performance of the degraded subsystem 102. The cognitive system 108-1, in some such embodiments, outputs for display on the display 110 an indication explaining that the degraded subsystem 102 is operating at a lower performance level, such as providing the indication proximate to the displayed predicted performance values. This indication provides a reminder to a user that the subsystem 102 is operating at a known degraded performance level. Thus, the user 102 does not have to track which subsystems 102 have already been determined to be operating at an expected degraded performance, as the control system 100 tracks and provides this information for the user on the display 110 in such embodiments. Additionally, the cognitive system 108-1 can determine, based on the measured values received from sensors 104, if a subsystem 102 needs to be repaired or replaced. For example, the detected difference may be determined to fall outside of normal or acceptable wear and tear (e.g. performance levels below a predetermined threshold). Such a determination can also be output to display 110 indicating a need for repair or replacement.

Thus, through the use of cognitive systems 108-1 and 108-2, embodiments of the control system 100 provide various advantages over conventional control systems. For example, through the use of aperiodic intervals as determined by cognitive system 108-1 discussed above, the amount of bandwidth needed to receive signals from each of the sensors can be more efficiently managed and the power consumed by the sensors 104 can be reduced. Furthermore, through the use of the values predicted by the cognitive system 108-2, a real-time graph of performance can continue to be provided to users despite the aperiodic nature of the measurement and reporting of measured values by sensors 104. In addition, by comparing the predicted values to measured values, degradation in performance can be identified as well as identifying if the differences are due to an external factor as opposed to degradation, as discussed above.

Furthermore, it is to be understood that although depicted as separate from control unit 106, one or more of the cognitive system 108-1 and the cognitive system 108-2 can be implemented as part of the control unit 106. That is, one or more processors, interfaces, memories, etc. of the control unit 106 can be configured to implement the functionality of the cognitive system 108-1 and/or cognitive system 108-2. Thus, it is further to be understood that the cognitive systems 108-1 and 108-2 can be implemented by the same device or unit, in some embodiments. In addition, it is to be understood that cognitive systems 108-1 and 108-2 can be trained using training data. For example, in some embodiments, different time constraints of systems under control can be specified and the full cycle operational response of the systems under control can be obtained under one or more operating conditions. The obtained full cycle operational response can be used to train the cognitive subsystems. For example, the full cycle operational response can be used to generate possible sets of data burst values used to train the cognitive systems 108-1 and 108-2.

Figure 2:
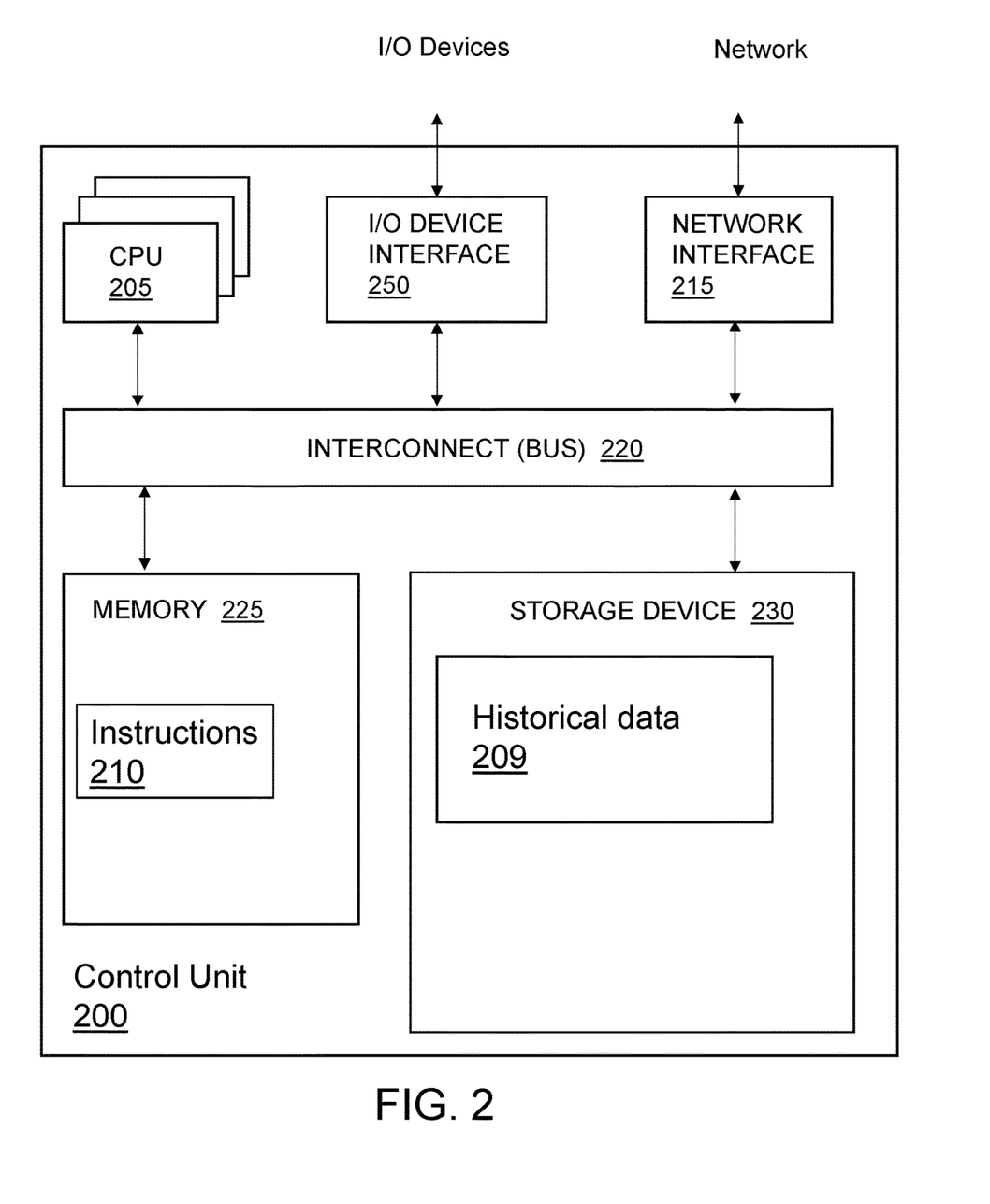
FIG. 2 is a block diagram of one embodiment of a control unit.

FIG. 2 is a high-level block diagram of one embodiment of a control unit 106 configured to implement the functionality of cognitive systems 108-1 and 108-2. In the example shown in FIG. 2, the control unit 200 includes a memory 225, storage 230, an interconnect (e.g., BUS) 220, one or more processors 205 (also referred to as CPU 205 herein), an Input/Output (I/O) device interface 250, and a network interface 215. It is to be understood that the control unit 200 is provided by way of example only and that the control unit 200 can be implemented differently in other embodiments. For example, in other embodiments, some of the components shown in FIG. 2 can be omitted and/or other components can be included.

Each CPU 205 retrieves and executes programming instructions stored in the memory 225 and/or storage 230. The interconnect 220 is used to move data, such as programming instructions, between the CPU 205, storage 230, network interface 215, and memory 225. The interconnect 220 can be implemented using one or more busses. The CPUs 205 can be a single CPU, multiple CPUs, or a single CPU having multiple processing cores in various embodiments. In some embodiments, a processor 205 can be a digital signal processor (DSP). Memory 225 is generally included to be representative of a random access memory (e.g., static random access memory (SRAM), dynamic random access memory (DRAM), or Flash). The storage 230 is generally included to be representative of a non-volatile memory, such as a hard disk drive, solid state device (SSD), removable memory cards, optical storage, or flash memory devices. In an alternative embodiment, the storage 230 can be replaced by storage area-network (SAN) devices, the cloud, or other devices connected to the control unit 200 via a communication network coupled to the network interface 215.

In some embodiments, the memory 225 stores instructions 210 and the storage 230 stores historical data 209. The historical data 209 can include past measurement values received from sensors 104. In some embodiments, the instructions 210 and the historical data 209 are stored partially in memory 225 and partially in storage 230, or they are stored entirely in memory 225 or entirely in storage 230, or they are accessed over a network via the network interface 215. Additionally, as discussed above, the historical data 209 can be stored in a database or memory device accessed via the network interface 215 rather than being locally attached or integrated with the control unit 200.

When executed, the instructions 210 cause the CPU 205 to analyze models to perform the functionality of cognitive systems 108-1 and 108-2 discussed above. For example, the instructions 210 can cause the CPU 205 to calculate aperiodic intervals as well as to predict performance values based on historical data 209. The instructions 210 further cause the CPU 205 to output signals and commands, such as information for display on a display device. The display can be connected to the control unit 200 via I/O device interface 250 and/or the network interface 215.

Figure 3:
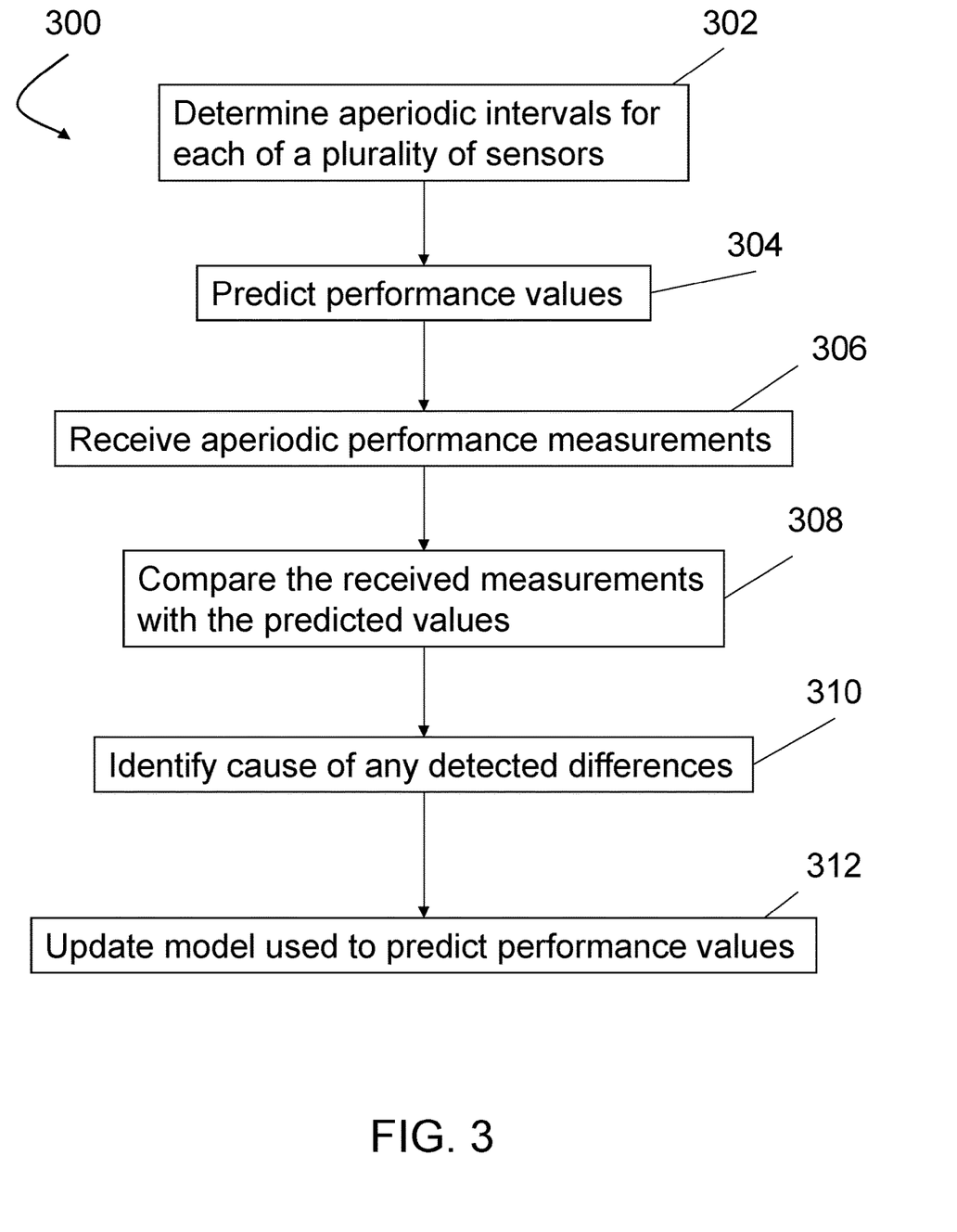
FIG. 3 is a flow chart depicting one embodiment of an example method of controlling a system using aperiodic data.

FIG. 3 is a flow chart depicting one embodiment of an example method 300 of controlling a system using aperiodic data. The method 300 can be implemented by a control unit, such as control unit 106. For example, the method 300 can be implemented by a CPU, such as CPU 205 in control unit 200, executing instructions, such as instructions 210. It is to be understood that the order of actions in example method 300 is provided for purposes of explanation and that the method can be performed in a different order in other embodiments. Similarly, it is to be understood that some actions can be omitted or additional actions can be included in other embodiments.

At 302, respective aperiodic intervals are determined for each of a plurality of sensors to obtain performance measurements of one or more subsystems. For example, each sensor may be associated with a different subsystem or two or more of the plurality of sensors may be associated with the same subsystem. As discussed above, the aperiodic intervals are determined to help minimize or avoid possible conflicts between two or more sensors (e.g. two or more sensors communicating at the same time on the same channel). Additionally, the aperiodic intervals can be determined based on power considerations of the sensors to help reduce the amount of power consumed by the sensors. Other factors which can be included in determining the aperiodic intervals can include, but are not limited to, current performance levels of the subsystems being monitored, data frequency needed to update models, etc.

The determined aperiodic intervals are communicated to each of the sensors, such as via a wired or wireless communication network. The aperiodic intervals indicate when the sensors are to take or obtain measurements. The intervals can be relative to a trigger event, as discussed above, or can be absolute times. In addition, the aperiodic intervals can also indicate when to report the measurements to the control unit. For example, in some embodiments, the sensors are configured to report the measurements at each aperiodic interval. In other embodiments, the sensors are configured to collect the measurements at each aperiodic interval and to report groups of measurements in bursts, as discussed above.

At 304, performance values of one or more subsystems being monitored are predicted based on historical data. For example, as discussed above, a cognitive system can use machine learning to analyze prior data from the one or more subsystems to develop a model to predict performance of the one or more subsystems, as discussed above. The predicted values can be output for display.

At 306, the performance measurements obtained by the sensors at the respective aperiodic intervals (also referred to herein as aperiodic performance measurements) are received from the sensors. For example, in some embodiments, the performance measurements are received according to the aperiodic intervals assigned to the sensors. That is, the performance measurements are received during the aperiodic interval in which the performance measurements are obtained by the sensors. In other embodiments, the sensors are configured to obtain the performance measurements at the respective aperiodic intervals and then to send a plurality of measurements obtained at a plurality of aperiodic intervals together in a data burst. That is, multiple performance measurements are received during the same data burst even though the performance measurements were obtained at different aperiodic intervals. The data burst can coincide with one of the respective aperiodic intervals assigned to each sensor or it can be a different time interval that does not coincide with obtaining a performance measurement. The performance measurements can be received over the same communication network over which the respective aperiodic intervals are communicated to the sensors. At 308, the received performance measurements are compared to the predicted performance values to identify any differences. Additionally, in some embodiments, the measured values are output for display with the predicted values. At 310, the cause of the identified differences is determined, as discussed above. For example, as discussed above, it can be determined if the differences are caused by an external event, by normal degradation (e.g. wear and tear) of the subsystem, and/or a failure in the subsystem. An indication of the identified differences can be output for display together with the predicted values. For example, in some embodiments, the indication identifies the cause of the detected differences. In other embodiments, the indication is implemented by displaying both the performance measurements obtained at the aperiodic intervals and the predicted values together.

Additionally, in some embodiments, the model used to predict the performance values is updated at 312 based on the differences in response to the determined cause of the differences. For example, in some embodiments, the model is not updated if an external cause is identified. Additionally, in some embodiments, the model is updated to reflect the normal degradation after a threshold number of cycles indicates a difference between the predicted and measured values. Thus, the method 300 enables the control system to be driven by aperiodic collection of measurements in order to reduce the power consumption and manage communication bandwidth while still providing real-time insights into the performance of the subsystems being controlled.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition, one or more functionalities of the system 100 can be implemented in a cloud computing environment. However, it is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
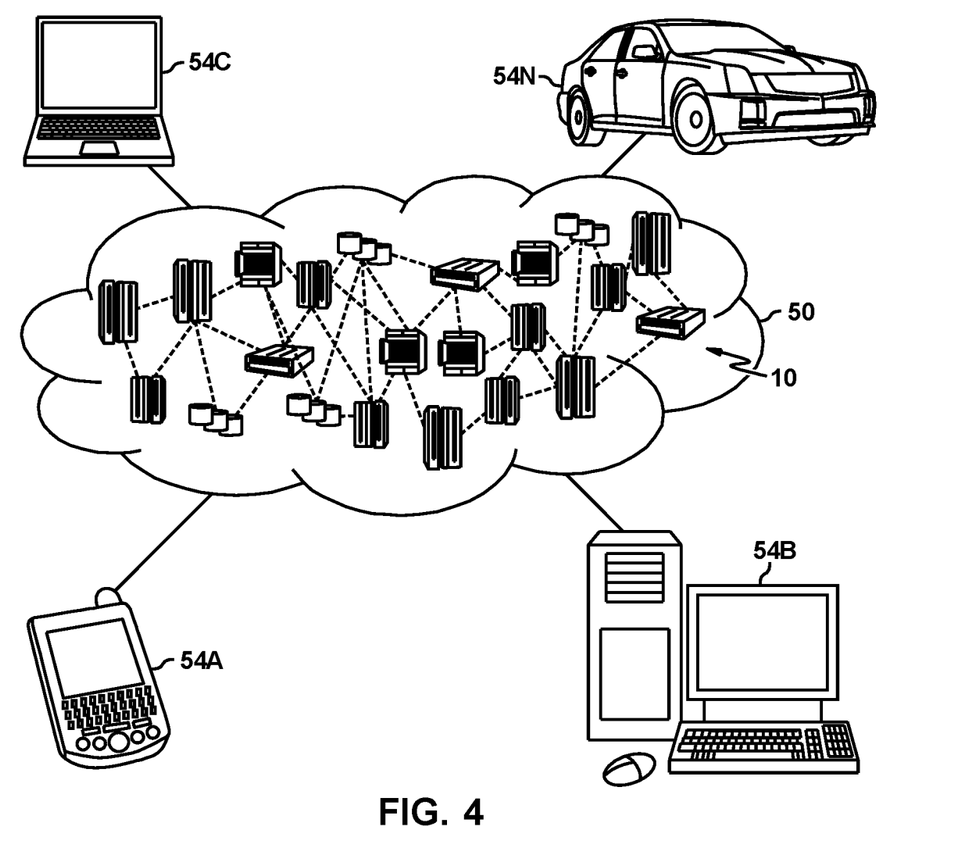
FIG. 4 depicts one embodiment of a cloud computing environment.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer device 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
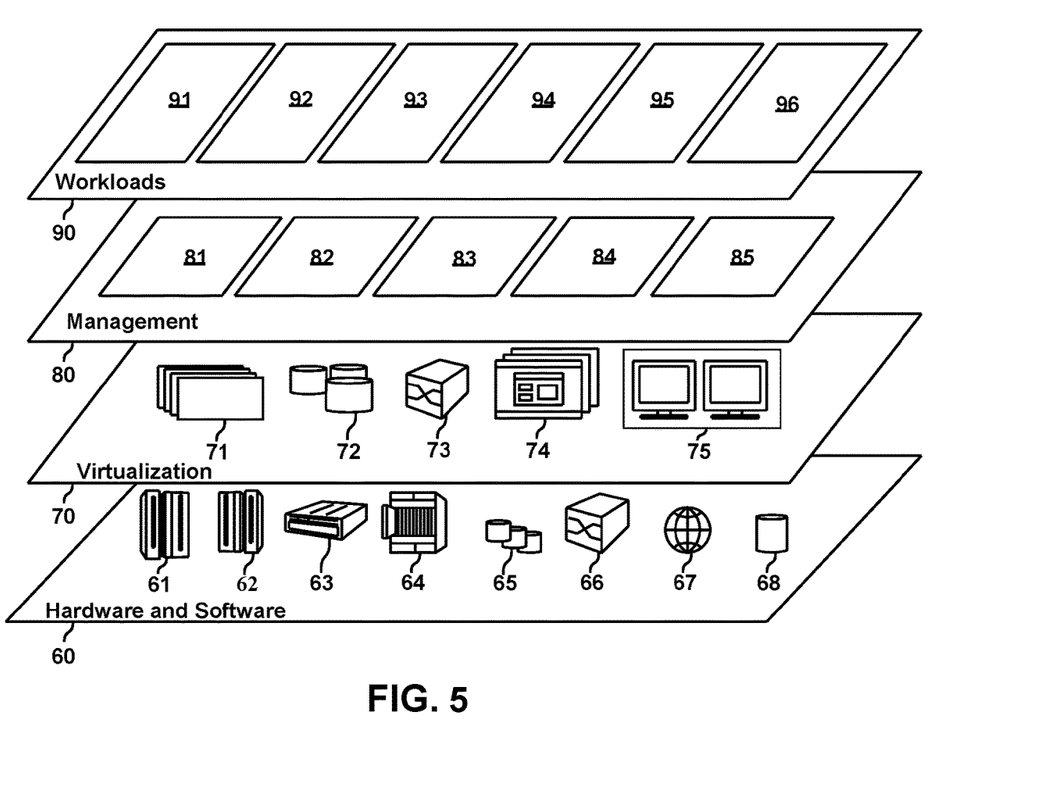
FIG. 5 depicts one embodiment of abstraction model layers.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and aperiodic cognitive control 96.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A method comprising:
determining respective aperiodic intervals for each of a plurality of sensors to obtain performance measurements of one or more subsystems;
predicting performance values of the one or more subsystems based on historical data;
outputting the predicted performance values in real-time as the one or more subsystems operate;
receiving the performance measurements obtained by the plurality of sensors;
comparing the performance measurements obtained by the plurality of sensors at the respective aperiodic intervals to the predicted performance values; and
in response to determining a difference between the performance measurements obtained at the respective aperiodic intervals and the predicted performance values, outputting an indication of the determined difference for display together with the predicted performance values.

2. The method of claim 1, wherein receiving the performance measurements comprises receiving respective performance measurements at each of the respective aperiodic intervals.

3. The method of claim 1, wherein receiving the performance measurements comprises receiving a receiving a plurality of the performance measurements in a data burst, wherein the plurality of the performance measurements received in the data burst were obtained by the plurality of sensors at a plurality of the respective aperiodic intervals.

4. The method of claim 1, further comprising identifying a cause of the determined difference.

5. The method of claim 4, further comprising:
in response to determining that the cause of the determined difference is normal degradation, updating a model used to predict the performance values.

6. The method of claim 4, further comprising outputting a notification of the cause of the determined difference for display with the predicted performance values and the received performance measurements.

7. The method of claim 1, further comprising:
detecting addition of one or more new sensors; and
in response to detecting the addition of the one or more new sensors, determining respective new aperiodic intervals for each of the one or more new sensors and respective new aperiodic intervals for each of the plurality of sensors to minimize communication collisions without increasing communication bandwidth.

8. A control system comprising:
one or more subsystems;
a plurality of sensors, each of the plurality of sensors associated with a respective one of the one or more subsystems; and
a control unit comprising a processor configured to execute instructions stored on a memory, wherein the control unit is communicatively coupled to the one or more subsystems and the plurality of sensors, the control unit configured to:
determine respective aperiodic intervals for each of the plurality of sensors to obtain performance measurements of the respective one or more subsystems;
predict performance values of the one or more subsystems based on historical data;
display the predicted performance values in real-time as the one or more subsystems operate;
receive the performance measurements obtained by the plurality of sensors;
compare the performance measurements obtained by the plurality of sensors at the respective aperiodic intervals to the predicted performance values; and
in response to determining a difference between the performance measurements obtained at the respective aperiodic intervals and the predicted performance values, display an indication of the determined difference together with the predicted performance values.

9. The control system of claim 8, wherein the control unit is configured to receive respective performance measurements at each of the respective aperiodic intervals.

10. The control system of claim 8, wherein the control unit is configured to receive a plurality of the performance measurements in a data burst, wherein the plurality of the performance measurements received in the data burst were obtained by the plurality of sensors at a plurality of the respective aperiodic intervals.

11. The control system of claim 8, wherein the control unit is further configured to identify a cause of the determined difference.

12. The control system of claim 11, wherein the control unit is further configured to update a model used to predict the performance values in response to determining that the cause of the determined difference is normal degradation.

13. The control system of claim 11, wherein the control unit is further configured to display a notification of the cause of the determined difference with the predicted performance values and the received performance measurements.

14. The control system of claim 8, wherein the control unit is further configured to:
detect addition of one or more new sensors; and
in response to detecting the addition of the one or more new sensors, determine respective new aperiodic intervals for each of the one or more new sensors and respective new aperiodic intervals for each of the plurality of sensors to minimize communication collisions without increasing communication bandwidth.

15. A computer program product comprising a computer readable storage medium having a computer readable program stored therein, wherein the computer readable program, when executed by a processor, causes the processor to:
determine respective aperiodic intervals for each of a plurality of sensors to obtain performance measurements of a respective one or more subsystems;
predict performance values of the one or more subsystems based on historical data;
output the predicted performance values for display in real-time as the one or more subsystems operate;
receive the performance measurements obtained by the plurality of sensors;
compare the performance measurements obtained by the plurality of sensors at the respective aperiodic intervals to the predicted performance values; and
in response to determining a difference between the performance measurements obtained at the respective aperiodic intervals and the predicted performance values, output an indication of the determined difference for display together with the predicted performance values.

16. The computer program product of claim 15, wherein the computer readable program is further configured to cause the processor to receive respective performance measurements at each of the respective aperiodic intervals.

17. The computer program product of claim 15, wherein the computer readable program is further configured to cause the processor to receive a plurality of the performance measurements in a data burst, wherein the plurality of the performance measurements received in the data burst were obtained by the plurality of sensors at a plurality of the respective aperiodic intervals.

18. The computer program product of claim 15, wherein the computer readable program is further configured to cause the processor to identify a cause of the determined difference.

19. The computer program product of claim 18, wherein the computer readable program is further configured to cause the processor to update a model used to predict the performance values in response to determining that the cause of the determined difference is normal degradation.

20. The computer program product of claim 15, wherein the computer readable program is further configured to cause the processor to:
   detect addition of one or more new sensors; and
   in response to detecting the addition of the one or more new sensors, determine respective new aperiodic intervals for each of the one or more new sensors and respective new aperiodic intervals for each of the plurality of sensors to minimize communication collisions without increasing communication bandwidth.

\* \* \* \* \*